(12) United States Patent
Zarubica et al.

(10) Patent No.: US 10,707,575 B1
(45) Date of Patent: Jul. 7, 2020

(54) NAVIGATION AWARE POWER LIMITING

(71) Applicant: L3 Technologies Inc., New York, NY (US)

(72) Inventors: Radivoje Zarubica, Sandy, UT (US); Brent Kenney, Bountiful, UT (US); Phillip M. Hirz, Holladay, UT (US); Thomas R. Giallorenzi, Sandy, UT (US); Andrew L. Nelson, Salt Lake City, UT (US); Jason Wilden, South Jordan, UT (US)

(73) Assignee: L3 Technologies, Inc., New York, NY (US)

( * ) Notice: Subject to any disclaimer, the term of this patent is extended or adjusted under 35 U.S.C. 154(b) by 324 days.

(21) Appl. No.: 15/605,354

(22) Filed: May 25, 2017

(51) Int. Cl.
*H01Q 3/28* (2006.01)
*H01Q 1/32* (2006.01)
*H01Q 3/26* (2006.01)

(52) U.S. Cl.
CPC ............. *H01Q 3/28* (2013.01); *H01Q 1/3233* (2013.01); *H01Q 3/267* (2013.01)

(58) Field of Classification Search
CPC ......... H01Q 3/28; H01Q 1/3233; H01Q 3/267
USPC ....................................................... 342/377
See application file for complete search history.

(56) References Cited

U.S. PATENT DOCUMENTS

| | | | | |
|---|---|---|---|---|
| 7,978,747 B1* | 7/2011 | Harris | ................... | H04B 1/707 370/328 |
| 8,933,840 B2* | 1/2015 | Hosoya | ................. | H01Q 3/267 342/373 |
| 2002/0022465 A1* | 2/2002 | McCullagh | ............ | G01S 19/36 455/260 |

* cited by examiner

*Primary Examiner* — Bo Fan
(74) *Attorney, Agent, or Firm* — Workman Nydegger

(57) ABSTRACT

Optimizations are provided for controlling an amount of radiated power (i.e. spectral flux density) that is being transmitted to a particular location. To that end, one or more antennas are used to transmit a power signal. Then, position information for each of those antennas is determined. Additionally, environmental information for the environment in which the antennas are operating is also determined. Also, an antenna radiation pattern for each of those antennas is also determined. Thereafter, how much power is radiated to a particular location is controlled so that the power never exceeds a certain threshold value. This control is achieved by dynamically adjusting the transmit power of the antennas based on the information obtained from the position information, the environmental information, and the antenna radiation pattern information.

20 Claims, 18 Drawing Sheets

1800

| Determine Position Information For Each Of The One Or More Antennas. | ~ 1810 |

| Determine Environmental Information For A Defined Three-dimensional Space Within Which Each Of The One Or More Antennas Is Operating. | ~ 1820 |

| Determine An Antenna Radiation Pattern For Each Of The One Or More Antennas. | ~ 1830 |

| Identify, Within The Defined Three-dimensional Space, One Or More Points Of Interest. | ~ 1840 |

| Control A Collective Power (SFD) That Is Radiated To The One Or More Points Of Interest And That Is Transmitted From The Combination Of The One Or More Antennas So That The Collective Power Is Less Than A Determined Threshold. | ~ 1850 |

- Determine Position Information For Both The First Antenna And The Second Antenna. — 1910

- Determine Environmental Information For A Terrain Over Which The First Antenna And The Second Antenna Are Operating. — 1920

- Determine An Antenna Radiation Pattern For Both The First Antenna And The Second Antenna. — 1930

- Identify A Ground-based Feature That Is Located On The Terrain Over Which The First Antenna And The Second Antenna Are Operating, Wherein The Environmental Information Includes Information About The Ground-based Feature. — 1940

- Control A Collective Power (SFD) That Is Radiated To The Ground-based Feature And That Is Transmitted From A Combination Of The First Antenna And The Second Antenna So That The Collective Power Is Less Than A Determined Threshold, Wherein The Controlling Of The Collective Power Is At Least Partially Based On 1) The Positional Information For The First Antenna And The Second Antenna, 2) The Information About The Ground-based Feature, 3) The Antenna Patterns For The First Antenna And The Second Antenna, And 4) A Combined Transmission Effect From A Signal Originally Transmitted From The First Antenna And A Signal Originally Transmitted From The Second Antenna. — 1950

- Whereby The Collective Power (SFD) Is Continuously Maximized At The Ground-based Feature While Continuously Staying Under The Determined Threshold. — 1960

FIGURE 19

NAVIGATION AWARE POWER LIMITING

CROSS-REFERENCE TO RELATED APPLICATIONS

None.

BACKGROUND

Computers and computing systems have impacted nearly every aspect of modern living. For example, computers are generally involved in work, recreation, healthcare, transportation, navigation, entertainment, household management, etc.

Modern navigation systems and object detection systems heavily rely on computing systems to provide real-time, accurate depictions of the physical world and to identify objects within that world. For instance, using various detection equipment (e.g., a Global Positioning System (GPS), a radar array, etc.), these systems can produce a real-time map of a particular environment; this map can include the various geographic features and structures that are present within that environment. The information provided from this real-time map can be critical in some situations. By way of example, commercial airliners that are flying through the air need to safely avoid other objects. By using integrated navigation systems and object detection systems, the airliners can safely travel through the air without obstruction. Here, it is worthwhile to note that some object detection systems include the use of a radio frequency ("RF") detection system. These RF detection systems are able to actively listen and detect RF transmissions. Using these RF detection systems, the object detection systems are able to provide more thorough and robust information when detecting and tracking objects within a particular environment.

Many different types of transport vehicles and/or base stations use navigation systems and object detection systems (including RF detection systems). As used herein, the term "vehicle" refers to any type of aircraft, sea craft, or land-based movable carrier. In light of this definition, the term "vehicle" should be construed broadly, and its interpretation should not be limited to any specific form. Continuing from above, many modern-day automobiles often have either a built-in or removable GPS that can be used to assist a driver when operating a vehicle. Similarly, planes also use navigation systems and object detection systems that can include a GPS. As detailed above, object detection systems may include the use of an RF detection system. These RF detection systems are able to identify the presence and even the location of an RF transmission source. Notably, this disclosure will specifically focus on the use of an RF transmission detector and source. Accordingly, as used herein, "object detection system" and "RF detection system" may be used interchangeably. Often, these types of RF detection systems include omnidirectional range instrumentation (e.g., antennas), landing instrumentation (e.g., distance measuring devices), Doppler navigation instrumentation, direction finders, etc. Further, RF detection systems utilize antennas to discern objects that are present within a certain environment.

In some circumstances, however, it may be desirable to minimize, or even completely eliminate, detection by an RF detection system. Low Probability of Detection (LPD) systems provide this unique ability. In particular, LPD systems are designed to specifically reduce or eliminate their detectable presence while still transmitting an RF signal. In other words, LPD systems are designed so that foreign (i.e. not a part of the LPD system) RF detection systems are not able to detect the LPD system.

Typical LPD systems employ directional antenna systems that are complicated, expensive, and may limit certain network connectivity. Further, traditional LPD systems that are mounted on vehicles also face detection challenges when those vehicles bank, roll, climb, dive, or otherwise change orientation and/or position. Notably, some traditional LPD systems can also use omni-directional antennas. By way of a brief introduction, omni-direction antennas are much less expensive than directional antennas and allow for a diverse range of potential network topologies. However, because omni-directional antennas allow power to propagate in all directions, traditional LPD systems that use these types of antennas currently face many challenges related to detection and are considered to be quite deficient.

The subject matter claimed herein is not limited to embodiments that solve any disadvantages or that operate only in environments such as those described above. Rather, this background is provided to illustrate only one exemplary technology area where some embodiments described here may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein include systems, computer-readable media, and methods that control an amount of radiated power (i.e. spectral flux density, hereinafter "SFD") that is transmitted to a particular location. These embodiments make use of one or more antennas in an effort to accomplish the foregoing objective. For instance, the embodiments determine position information (which includes both position and orientation information) for each of the antennas. Further, these embodiments also determine environmental information for a defined three-dimensional space within which the antennas operate. The embodiments are also configured to determine an antenna radiation pattern for each of the antennas. Then, the embodiments identify (within that three-dimensional space) one or more points of interest. A collective power (i.e. the SFD) that is radiated to the one or more points of interest and that is transmitted from the antennas is controlled such that the collective power is restricted so that it is less than a determined threshold value. To control that collective power, the embodiments factor in the position information for each of the antennas, the environmental information for the three-dimensional space, and the antenna radiation pattern for each of the antennas. As a result, the embodiments are able to dynamically control (e.g., in real-time) how much power is radiated from certain antennas to a particular location in space; further, the embodiments are able to immediately respond to position and/or orientation changes of the antennas to ensure that the transmitted power never exceeds the desired threshold.

Other embodiments also provide for the control of radiated power (i.e. SFD) that is transmitted to a particular location. In particular, these embodiments specifically utilize at least two antennas, where a first antenna is mounted at a position that is different than a mounting position of the second antenna (e.g., the first antenna is mounted vertically higher than the second antenna). These embodiments determine position information, environmental information, and antenna radiation patterns. In some instances, because the location of an RF detection system might not be known, these embodiments are able to run calculations on all of the terrain points. As a result, these embodiments are able to cover all of the possible, or potential, locations of an RF detection system and then perform in accordance with those determinations. Even further, these embodiments are able to factor in three-dimensional ("3D") spatial characteristics such that the embodiments are not limited to performing only ground-based calculations. For example, these embodiments are able to define a certain 3D radius about the vehicle and then perform the calculations in all three dimensions such that the embodiments are not limited to performing calculations only for ground-based features. Additionally, these embodiments include the ability to specifically identify a ground-based feature that is located on a terrain over which the first and second antennas are operating. Notably, the environmental information includes information about that ground-based feature (e.g., the surrounding terrain, a building's schematic, etc.). The embodiments are configured to control a collective power (i.e. SFD) that is radiated to the ground-based feature and that is transmitted from a combination of the first antenna and the second antenna (e.g., a signal transmitted from the first antenna is added in a non-coherent manner to a signal transmitted from the second antenna). The embodiments control this collective power (i.e. SFD) so that the collective power is less than a determined threshold. This controlling process is at least partially based on the position information for the first and second antenna, the information about the ground-based feature, the antenna radiation patterns for the first and second antennas, and a combined transmission effect from a signal originally transmitted from the first antenna and a signal originally transmitted from the second antenna. As a result, the collective power is continuously maximized at the ground-based feature while continuously meeting the determined threshold requirement.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which:

FIG. 18 illustrates steps in an exemplary method that can be followed to dynamically control how much power is radiated to a certain location.

FIG. 19 illustrates a different set of steps in an exemplary method that can also be followed to dynamically control radiated power.

DETAILED DESCRIPTION

Figure 1:
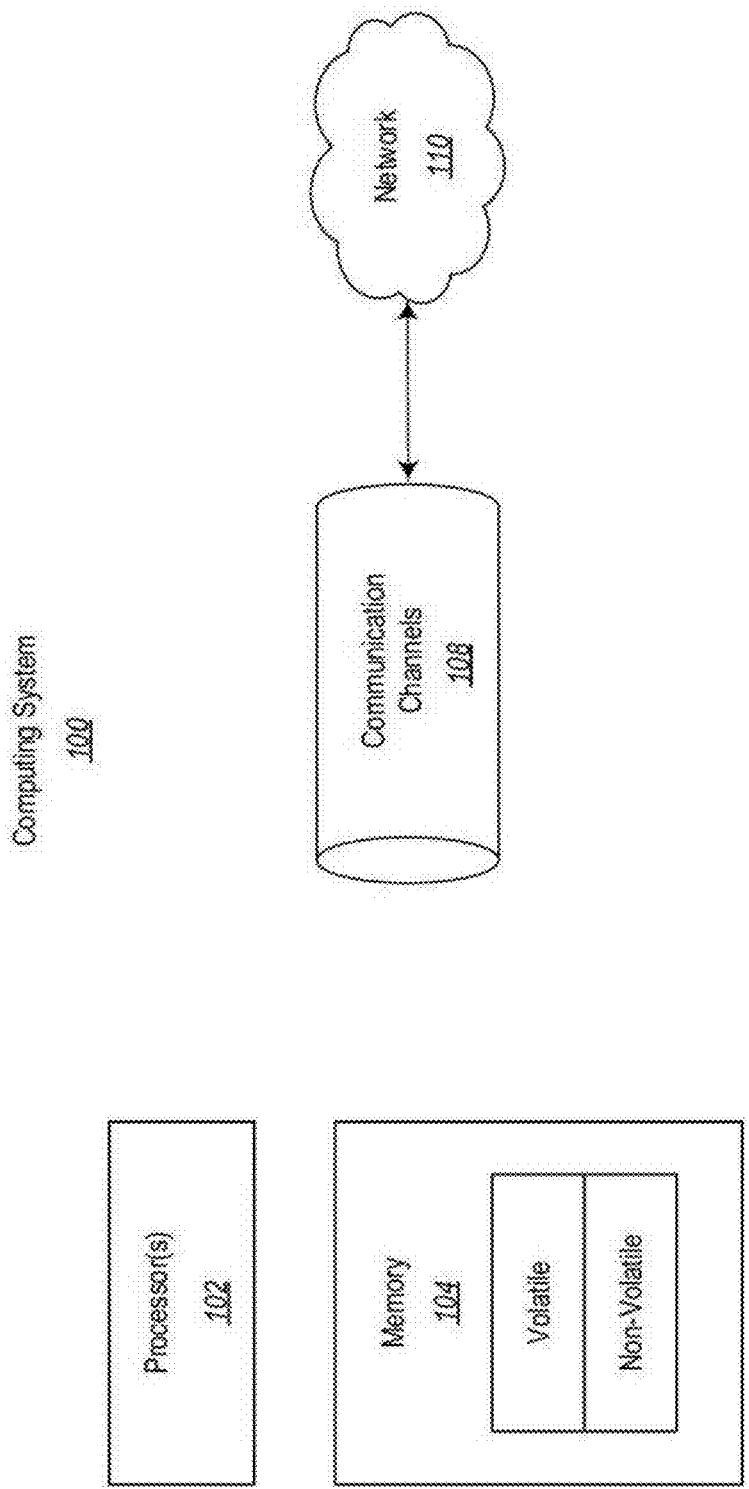
FIG. 1 illustrates an abstract view of some of the basic components of a computing system.

The LPD embodiments described herein include systems, computer-readable media, and methods that control an amount of radiated power (i.e. SFD) that is transmitted to a particular location. These embodiments use one or more antennas in an effort to accomplish the foregoing objective. For instance, the embodiments determine position information, which includes both position and orientation information, for each of the antennas. Further, these embodiments also determine environmental information for a defined three-dimensional space within which the antennas operate. The embodiments are also configured to determine an antenna radiation pattern for each of the antennas. Then, the embodiments identify (within that three-dimensional space) one or more points of interest. A collective power (i.e. SFD) that is radiated to the one or more points of interest and that is transmitted from the antennas is controlled such that the collective power is restricted to be less than a determined threshold value. To control that collective power (i.e. the SFD), the embodiments factor in the position information for each of the antennas, the environmental information for the three-dimensional space, and the antenna radiation pattern for each of the antennas. As a result, the embodiments dynamically control (e.g., in real-time) how much power (i.e. SFD) is radiated from certain antennas to a particular location in space; further, the embodiments are able to immediately respond to position and/or orientation changes of the antennas to ensure that the transmitted power (i.e. SFD) never exceeds the desired threshold.

Other embodiments also provide for the control of radiated power (i.e. SFD) that is transmitted to a particular location. In particular, these embodiments specifically utilize at least two antennas, where a first antenna is mounted at a position that is different than a mounting position of the second antenna (e.g., the first antenna is mounted vertically higher than the second antenna). These embodiments also determine position information, environmental information, and antenna radiation patterns. In some instances, because the location of an RF detector might not be known, these embodiments are able to run calculations on all of the terrain points. As a result, these embodiments are able to cover all of the possible, or potential, locations of an RF detector and then perform in accordance with those determinations. Even further, these embodiments are able to factor in three-dimensional ("3D") spatial characteristics such that the embodiments are not limited to performing calculations on only ground-based features. For example, these embodiments are able to define a certain 3D radius about the vehicle and then perform the calculations in all three dimensions such that the embodiments are not limited to performing calculations only for ground-based features. Additionally, however, the embodiments include the ability to identify a ground-based feature that is located on a terrain over which the first and second antennas are operating. The environmental information includes information about that ground-based feature (e.g., the surrounding terrain, a building's schematics, etc.). The embodiments are also configured to control a collective power (i.e. SFD) that is radiated to the ground-based feature and that is transmitted from a combination of the first antenna and the second antenna (e.g., a signal transmitted from the first antenna is added in a non-coherent manner to a signal transmitted from the second antenna). Notably, the embodiments control this collective power (i.e. SFD) so that the collective power is less than a determined threshold. This controlling process is at least partially based on the position information for the first and second antenna, the information about the ground-based feature, the antenna radiation patterns for the first and second antennas, and a combined transmission effect from a signal originally transmitted from the first antenna and a signal originally transmitted from the second antenna. As a result, the collective power (i.e. SFD) is continuously maximized at the ground-based feature while continuously meeting the determined threshold requirement.

Accordingly, the embodiments described herein overcome many deficiencies prevalent throughout the conventional technology. Further, these embodiments provide for many other substantial benefits that will be described throughout the remainder of this disclosure.

Figure 2:
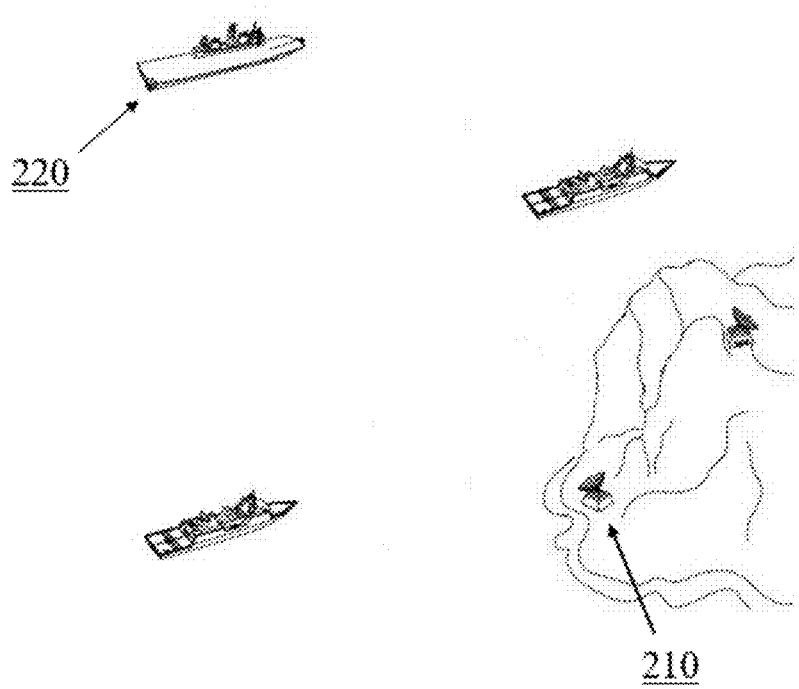
FIG. 2 illustrates an environment in which some of the embodiments may operate.
Figure 3:
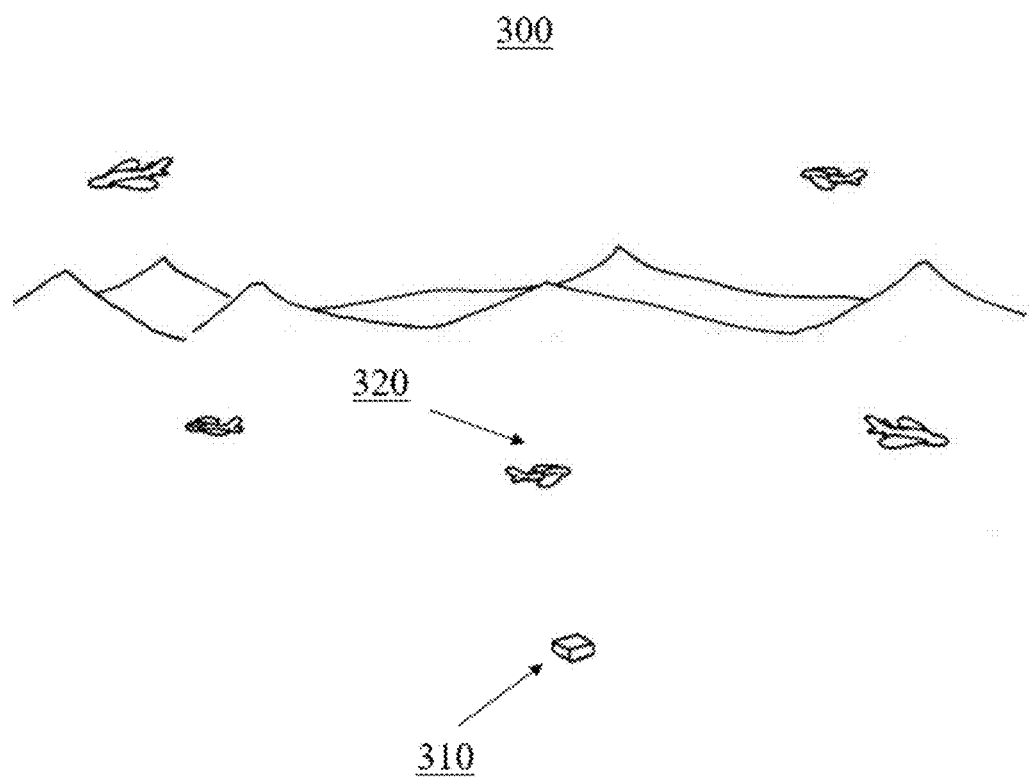
FIG. 3 illustrates another example environment in which some of the embodiments may operate.

Initially, some introductory discussion of a computing system will be described with respect to FIG. 1. FIGS. 2-3 then illustrate a couple of example environments within which the present embodiments may operate. FIGS. 4-16 then expound on various aspects of the present invention. Lastly, additional supporting architectures and methods using the novel principles described herein will be described with respect to the subsequent figures.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory, and/or storage capability may be distributed as well. As used herein, the term "executable module," "executable component," or even "component" can refer to software objects, routines, or methods that may be executed on the computing system. The different components, modules, engines, and services described herein may be implemented as objects or processors that execute on the computing system (e.g. as separate threads).

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are physical computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network," like the network 110 shown in FIG. 1, is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. As shown in FIG. 1, the computing system 100 will include one or more communication channels 108 that are used to communicate with the network 110. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIGS. 2 and 3 illustrate some example environments in which the LPD embodiments of the present invention can be implemented. The LPD embodiments described throughout this disclosure utilize the type of computer system 100 described with respect to FIG. 1.

In particular, FIG. 2 shows a land and sea-based environment 200 that includes floating vessels (e.g., the ship 220) and a ground-based RF detection unit 210. The ground-based RF detection unit 210 listens for RF signals resulting from communication transmissions to detect the origination of those RF communication transmissions (e.g., the communications arise from the ship 220) in the environment 200. The ground-based RF detection unit 210 is able to detect an RF signal if that RF signal is above a certain threshold level. As indicated earlier in this disclosure, however, it may be desirable for the ship 220 to avoid being detected by the ground-based RF detection unit 210. FIG. 2 is provided to show that the embodiments of the present invention can be utilized in a variety of environments, some of which include sea-based environments.

Similar to FIG. 2, FIG. 3 shows another exemplary environment in which embodiments of the present invention may be utilized. Specifically, FIG. 3 shows a land and air-based environment 300 that includes an aircraft 320 and a different ground-based RF detection unit 310. As shown in FIG. 3, the ground-based RF detection unit 310 is also listening for signals resulting from communication transmissions in an attempt to locate and identify objects (e.g., the plane 320). Similar to the ship 220 in FIG. 2, it may be desirable for the aircraft 320 to avoid being detected by the ground-based RF detection unit 310. Accordingly, by using the principles and functions described throughout the remainder of this disclosure, platforms that contain the present LPD embodiments (e.g., the ship 220 or the aircraft 320) can avoid detection from RF detection units (e.g., the ground-based RF detection units 210 and 310).

Although FIGS. 2 and 3 illustrate land/sea-based and land/air-based environments, the embodiments of the present invention are not so limited and can be realized in any environment where detection is sought to be prevented or mitigated. To clarify, the embodiments of the present invention are designed to limit and/or completely eliminate the ability of an RF detection unit (e.g., the ground-based RF detection unit 310 shown in FIG. 3) to detect an RF signal (e.g., originating from the plane 320 in FIG. 3). Although FIGS. 2 and 3 show example environments in which the present embodiments may be utilized, the embodiments should not be limited to only those illustrated environments. Indeed, the embodiments can be utilized in any type of environment in which RF detection is sought to be avoided. By way of a brief example, the embodiments can be implemented in an airspace-only environment or in a sea-only environment. Accordingly, although the environments 200 and 300 demonstrate some example environments, the embodiments of the present invention should not be limited only to those environments.

Figure 4:
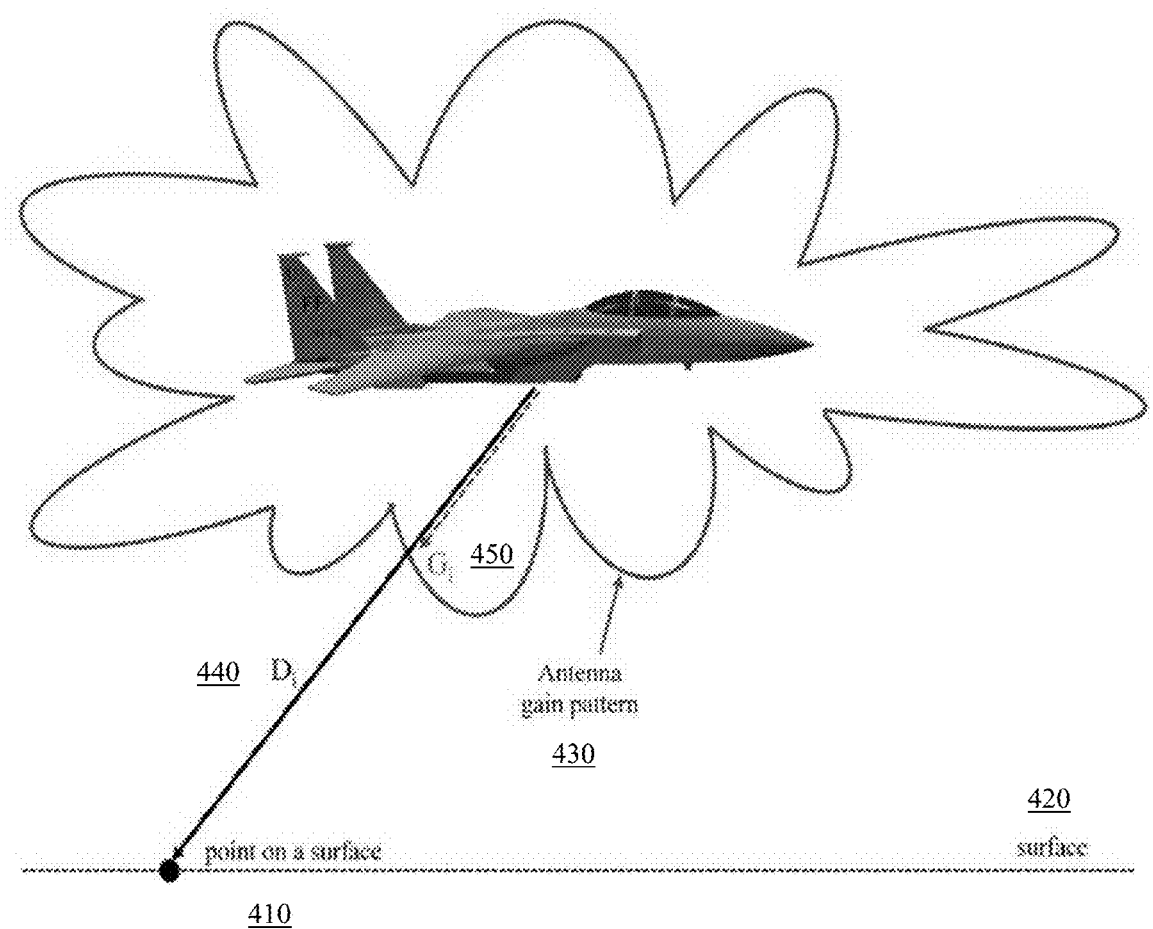
FIG. 4 illustrates a situation in which power is limited for a single antenna.

As an introduction to the present LPD embodiments, FIG. 4 shows one embodiment that is situated in an aircraft. In some circumstances, that aircraft will fly in allowable airspace. In this circumstance, the ability of the aircraft to avoid RF detection is not highly critical. In contrast, however, suppose that the aircraft travels through contested and/or denied airspace (e.g., perhaps in a military situation). When confronted with such a situation, it will likely be critical that the aircraft avoid RF detection by any RF detection units.

For instance, FIG. 4 shows an aircraft flying above the ground surface 420. FIG. 4 also shows a point of interest 410 on the surface 420. This point of interest 410 can be home to any type of RF detection unit; alternatively, the point of interest 410 may be any other type of location in which it is desirable to avoid introducing interference. By way of example and not limitation, many residential areas have Wi-Fi and other communication systems that propagate signals, including RF signals, through the air. Similarly, some research institutions may have highly sensitive data acquisition equipment that may be sensitive to external power fluctuations. When confronted with situations similar to those described above, it may be desirable to limit and/or reduce the amount of power (i.e. SFD) that is transmitted from an antenna. Accordingly, the present embodiments dynamically restrict the amount of power (i.e. SFD) that is being transmitted to the point of interest 410 so that the LPD embodiments are not detectable by (or at) the point of interest 410.

Although the present embodiments can be implemented in a variety of ways, the following discussion will discuss embodiments that are airborne. As discussed earlier, traditional LPD systems employ directional antenna systems that can be complicated, expensive, and unnecessarily limiting. Some traditional LPD systems can use omni-directional antennas. Omni-direction antenna systems are much less expensive and allow for a diverse range of potential network topologies, but omni-directional antennas allow power to propagate in all directions. As a result, traditional LPD systems are quite deficient when attempting to prevent RF detection when communications occur in multiple directions. To illustrate some of the challenges that traditional LPD systems face, consider a situation in which omni-directional antennas are mounted on the top side of an aircraft. In this circumstance, the aircraft can capitalize on some LPD advantages since the power (i.e. SFD) that reaches the ground is limited by the aircraft's own fuselage obstruction. As the aircraft banks or flies over large terrain features, however, those LPD advantages are lessened because the SFD that was blocked can now propagate to new, previously inaccessible locations.

In an effort to resolve the challenges that traditional LPD systems face, the present embodiments control, or rather limit, the power (i.e. SFD) that is transmitted from an antenna by factoring in position information, environmental information, and antenna radiation pattern information. To do so, the embodiments use navigation data (e.g., latitude, longitude, altitude, and attitude) in combination with the known characteristics of the antennas to calculate the Spectral Flux Density (SFD) at each location within a three-dimensional space. Stated differently, the embodiments adjust the transmitter power of the antenna so that the SFD at various points of interest within the three-dimensional space will not exceed a determined SFD threshold. Here, it is worthwhile to note that the present embodiments are able to use one or more of a steerable (e.g., roll-stabilized) antenna or a fixed (e.g., non-steerable) antenna. To achieve these benefits, it is necessary to first ascertain the relationship between the transmitted power and the SFD at each point in the three-dimensional space.

For completeness, it is necessary to first derive the relationship between the transmitted power (designated as "P" in the equations listed below) and the SFD in a situation in which only a single transmitter and antenna is used. FIG. 4 illustrates the antenna radiation pattern 430 (i.e. gain pattern characteristics) for an antenna in relation to the surface 420. The SFD at the point of interest 410 (designated i in the equation below) is defined in the following manner:

$$SFD_i = \frac{P * G_i}{BW * 4 * \pi * D_i^2} \quad \text{Equation 1}$$

BW is the bandwidth of the signal (in Hz); $D_i$ (visually depicted as $D_i$ 440 in FIG. 4) is the distance from the antenna to the point of interest 410 (in meters); and G is the antenna's gain. It is desirable to adjust the power so that the SFD≤T for every point of interest 410 on the surface 420, where T is a determined threshold value. Therefore, to satisfy the SFD threshold requirement for every point of interest 410 on the surface 420, the transmitter power needs to be:

$$P \leq \frac{BW * 4 * \pi * D_i^2 * T}{G_i} \quad \text{Equation 2}$$

The above inequality is satisfied for every point of interest 410 on the surface 420 if: 1) $P_i$ is calculated in the manner show below for every point of interest 410 and 2) if the smallest $P_i$ were chosen as the transmitter power P.

$$P_i = \frac{BW * 4 * \pi * D_i^2 * T}{G_i} \quad \text{Equation 3}$$

Figure 5:
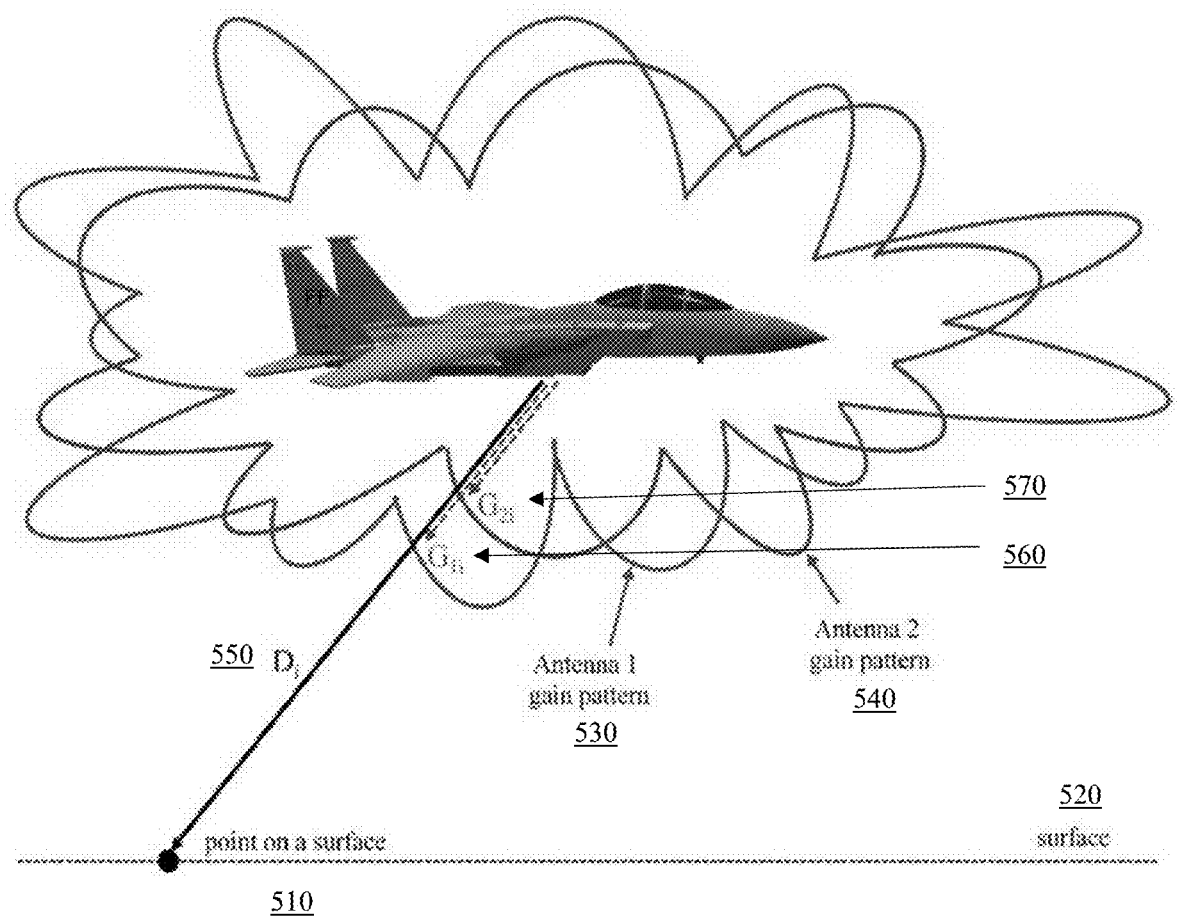
FIG. 5 illustrates a situation in which power is limited for multiple antennas.

In contrast to FIG. 4 which shows a single transmitter/antenna unit, FIG. 5 shows a situation where multiple transmitters and antennas are present in the LPD system (in this situation there are two antennas). In particular, FIG. 5 shows a point of interest 510, the surface 520, the distance (designated $D_i$ 550 in FIG. 5) between the antenna and the point of interest 510, the first antenna's pattern 530, the second antenna's pattern 540, the first antenna's gain 560, and the second antenna's gain 570.

In situations where multiple antennas are present, the calculations that are needed to satisfy the SFD threshold at the point of interest 510 are more complicated. The primary reason for the additional complexity is due to the fact that the two transmitters cannot be treated separately. For example, in some situations and at some locations, the power (i.e. SFD) transmitted from the two different antennas can be combined in a non-coherent manner which may result in a situation where the threshold is exceeded. To ensure that the power (i.e. SFD) transmitted to each point of interest 510 does not exceed the threshold, it is necessary that the transmitted power (i.e. SFD) from each antenna is not considered on an individual level; rather, the combination of the transmitted power (i.e. SFD) from all of the antennas must be considered in a joint manner.

Determining the contribution from additional antennas is not overly difficult when the transmitted powers and the antenna radiation patterns are known. However, dynamically adjusting the transmitted powers when the SFD is exceeded (e.g., due to adding of power in a non-coherent manner), is a difficult problem that is solved by the current embodiments. It is noted that the worst-case scenario for non-coherent power additions occurs when both powers are limited by the same point of interest on the surface. In this situation, the power contribution from both antennas at that point is equal, which means that the SFD threshold will be exceeded by 3 dB.

Figure 6:
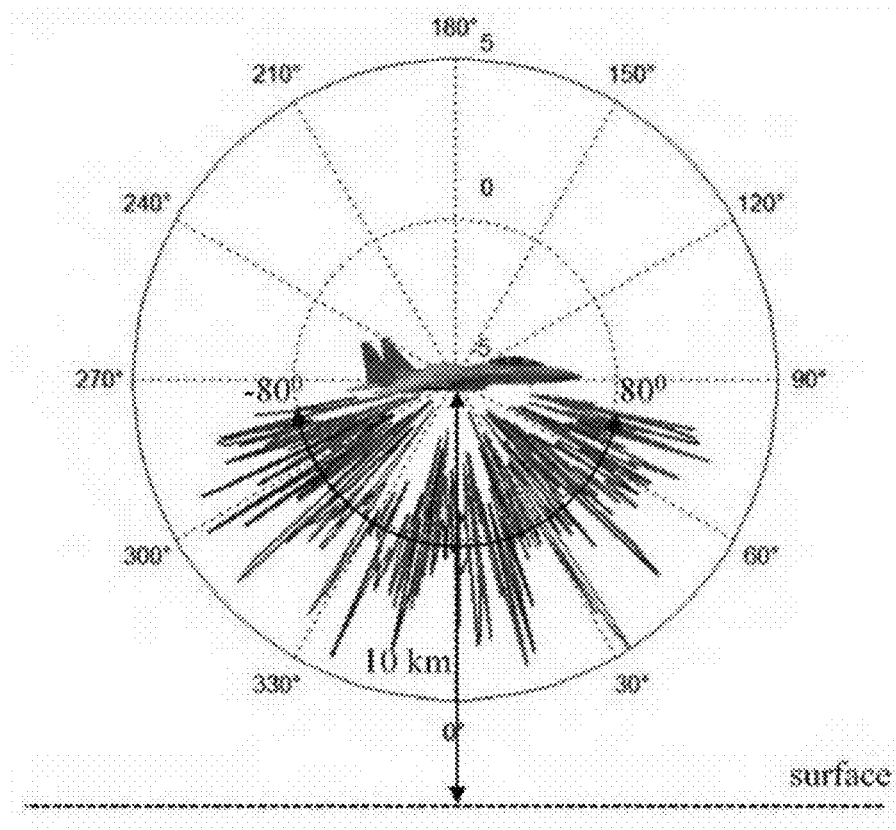
FIG. 6 illustrates an example antenna geometry.

To evaluate the effects of multiple-antenna power adjustments, the geometry (i.e. parameters) of FIG. 6 is assumed. FIG. 6 illustrates an aircraft that is located 10 km above the surface. This surface is depicted as a line on the ground that lies within −80° and +80° of the look angle of the plane. In this situation, it is assumed that the bandwidth (BW) of the transmitted signal is 45 MHz and the SFD threshold is −200 dBW/Hz/m². Although 45 MHz and −200 dBW/Hz/m² are being used for this particular example, a person skilled in the art will appreciate that the embodiments are not limited solely to these values or to these conditions.

Figure 7:
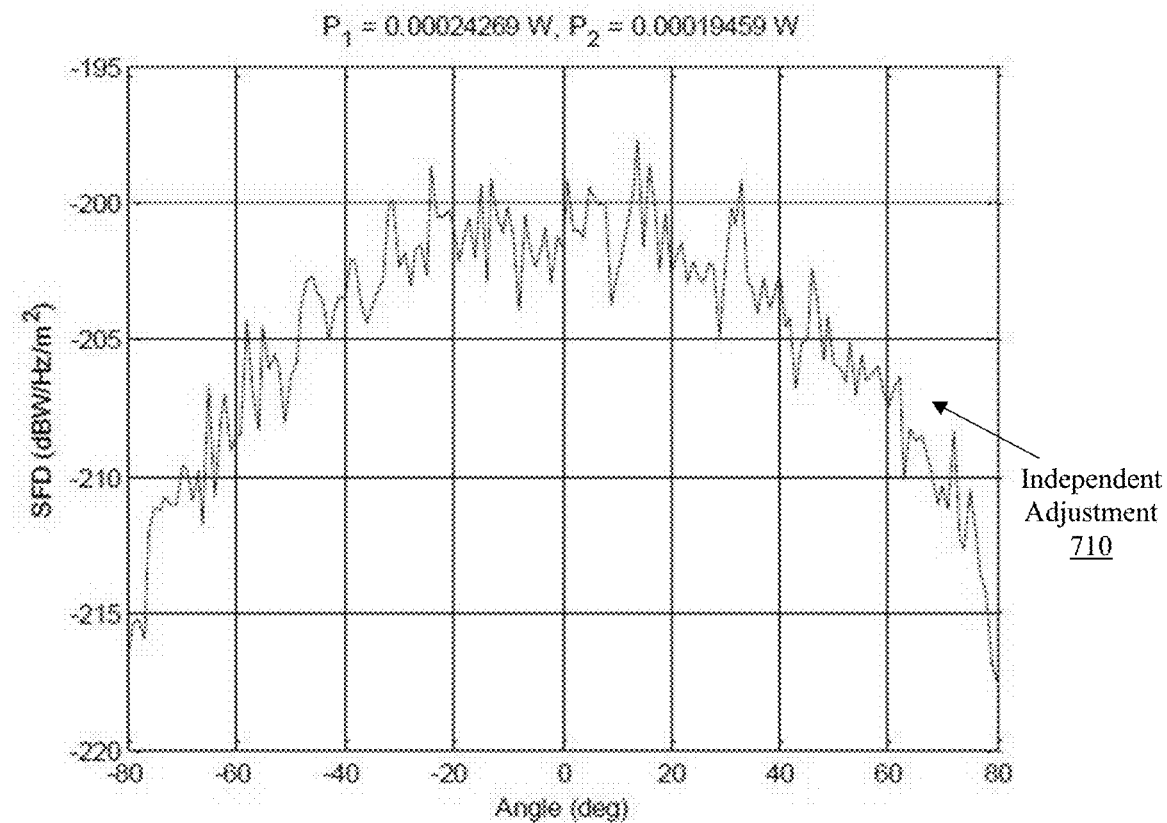
FIG. 7 illustrates a spectral flux density (SFD) at each point on a surface.

FIG. 7 shows what occurs when the transmitted powers from the antennas are considered individually (as opposed to jointly). After being adjusted independently of each other, the resulting transmitted power that is received at the points on the surface is shown by the line 710 in the graph illustrated in FIG. 7. To clarify, FIG. 7 shows the SFD at each point on the surface when the powers from each antenna are considered and adjusted in an independent manner. These powers are independently adjusted according to Equation 3. FIG. 7 is provided in an effort to show why the transmitted powers cannot be considered independently.

As shown by FIG. 7, there are a few points on the surface where the SFD threshold is exceeded (i.e. where the line 710 extends beyond the −200 dBW/Hz/m² threshold mark). As indicated earlier, exceeding the threshold is not desirable because the LPD system will become detectable at the point where the threshold is exceeded. For these initial stages of the analysis, a suboptimal modification scheme will first be applied to the transmitted powers; later in this disclosure, an optimal scheme will be described in detail. This suboptimal modification procedure does not require any joint power adjustments between the various transmitters. Instead, once the transmit power $P_1$ of the first transmitter and the transmit power $P_2$ of the second transmitter is calculated, then the following algorithm can be applied to evaluate the total SFD for each point of interest (e.g., the point of interest 510 in FIG. 5) on the surface (e.g., surface 520 in FIG. 5). Here, it is worthwhile to note that in the referenced figures, the threshold and SFD is represented in units of dBW/Hz/m². Notably, however, the listed equations indicate the threshold and SFD in a linear manner. To clarify, the listed equations represent SFD in W/Hz/m².

$$SFD_{total\_i} = \frac{P_1 * G_{1i} + P_2 * G_{2i}}{BW * 4 * \pi * D_i^2} \quad \text{Equation 4}$$

Once the $SFD_{total\_i}$ is calculated for each point of interest on the surface, an adjustment factor ($\alpha$) will be applied in the following manner where T is the SFD threshold in W/Hz/m²:

$$\alpha = \frac{T}{\max_i (SFD_{total\_i})} \quad \text{Equation 5}$$

The final power levels are calculated as:

$$P_{1final} = \alpha * P_1 \text{ and } P_{2final} = \alpha * P_2 \quad \text{Equation Set 6}$$

Figure 8:
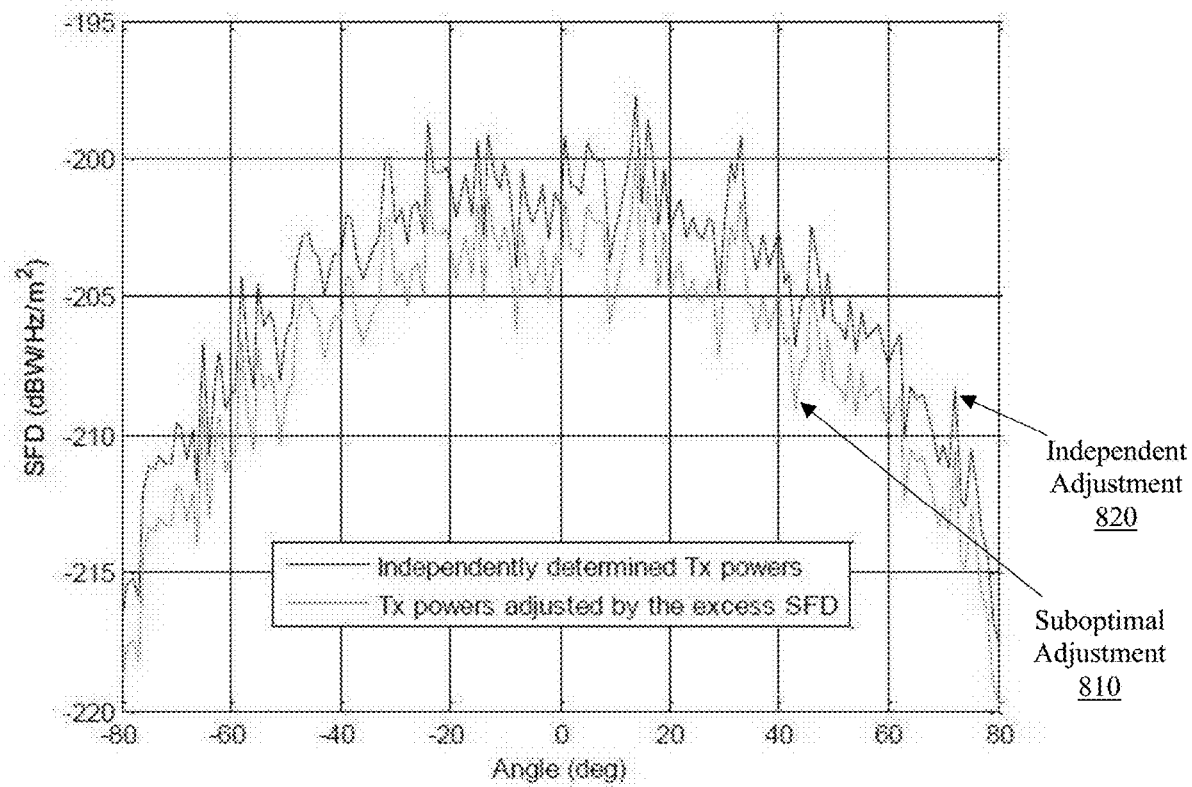
FIG. 8 illustrates the SFD at each point on the surface before and after a certain adjustment is performed.

FIG. 8 shows the SFD at each point on the surface using the suboptimal adjustment and the independent adjustment. To clarify, line 810 shows the resulting SFD after the suboptimal adjustment is applied and line 820 shows the resulting SFD after the independent adjustment is applied (which is the same as line 710 in FIG. 7). As shown in FIG. 8, the suboptimally adjusted transmitter powers (i.e. line 810) never exceeds the −200 dBW/Hz/m² threshold mark whereas the independently adjusted transmitter powers (i.e. line 820) does exceed the −200 dBW/Hz/m² threshold mark.

To reiterate, the suboptimal adjustment (i.e. line 810 that is visually depicted in FIG. 8) will enable an LPD system to prevent its transmitted power levels from exceeding the desired threshold. However, the embodiments provide an even more robust solution by providing the "best" or "optimal" way to adjust the powers. To do so, it is necessary to define the criteria for "optimality." For the one antenna case, a solution was considered optimal if it maximizes transmit power without exceeding the SFD threshold at any of the points on the surface. For a multi-antenna system, similar criteria can be followed.

To find the optimal solution for a multi-antenna system, it is necessary to re-order some of the parameters that were previously described with respect to Equation 4 to that which is shown in the equation set found below:

$$SFD_{total\_i} = P_1 * K_{1i} + P_2 * K_{2i}$$

where $$K_{1i} = \frac{G_{1i}}{BW * 4 * \pi * D_i^2} \quad \text{Equation Set 7}$$

$$K_{2i} = \frac{G_{2i}}{BW * 4 * \pi * D_i^2}$$

Continuing with the analysis, it is necessary to make sure that the SFD at each point on the surface does not exceed the SFD threshold (T), to do so, the following inequality is used:

$$P_1 * K_{1i} + P_2 * K_{2i} \leq T \quad \text{Equation 8}$$

Figure 9:
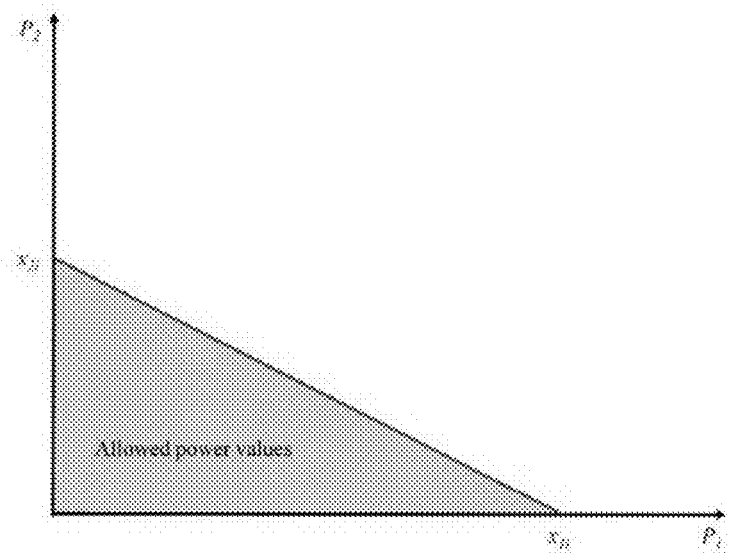
FIG. 9 illustrates the allowed power values at a point on the surface.

A graphical representation of the inequality illustrated by Equation 8 is shown in FIG. 9. The particular values for this equation are calculated as follows:

$$x_{1i} = \frac{T}{K_{1i}} \quad \text{Equation Set 9}$$

$$x_{2i} = \frac{T}{K_{2i}}$$

If there was only one point (i) on the surface, any power value inside the shaded triangle in FIG. 9 could be selected. However, in order to find an optimal solution that maximizes the total transmitted power without exceeding the threshold (T), it is necessary to choose a specific point. To find a point in the ($P_1$, $P_2$) plane that maximizes the total transmitted power, it is necessary to constrain the inequality of Equation 8 with the total power constraint shown below in Equation 10.

$$P_{tot} = P_1 + P_2 \quad \text{Equation 10}$$

Figure 10:
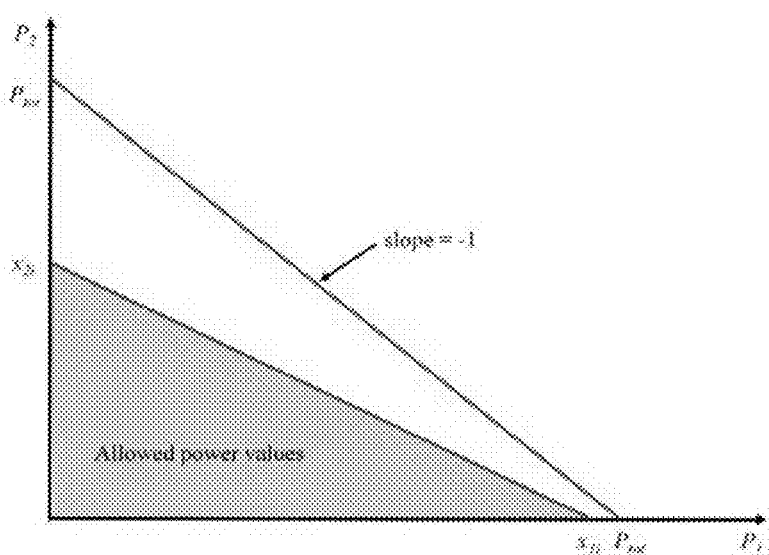
FIG. 10 further extrapolates on the allowed power values at the point on the surface.

FIG. 10 is a graphical representation of Equations 8 and 10. In particular, FIG. 10 shows the allowed power values at each point (i) on the surface.

The values $P_1$ and $P_2$ that maximize $P_{tot}$ are located at either ($x_{1i}$, 0) or (0, $x_{2i}$), depending on the values for $x_{1i}$ and $x_{2i}$ such that the larger of the two values defines the optimal power values. In FIG. 10, the optimal power values are when $P_1 = x_{1i}$ and $P_2 = 0$. While FIGS. 9 and 10 illustrate the problem of finding the optimal power values when only one point (i) on the surface is considered, FIG. 11 illustrates what happens when multiple points on the surface are considered.

Figure 11:
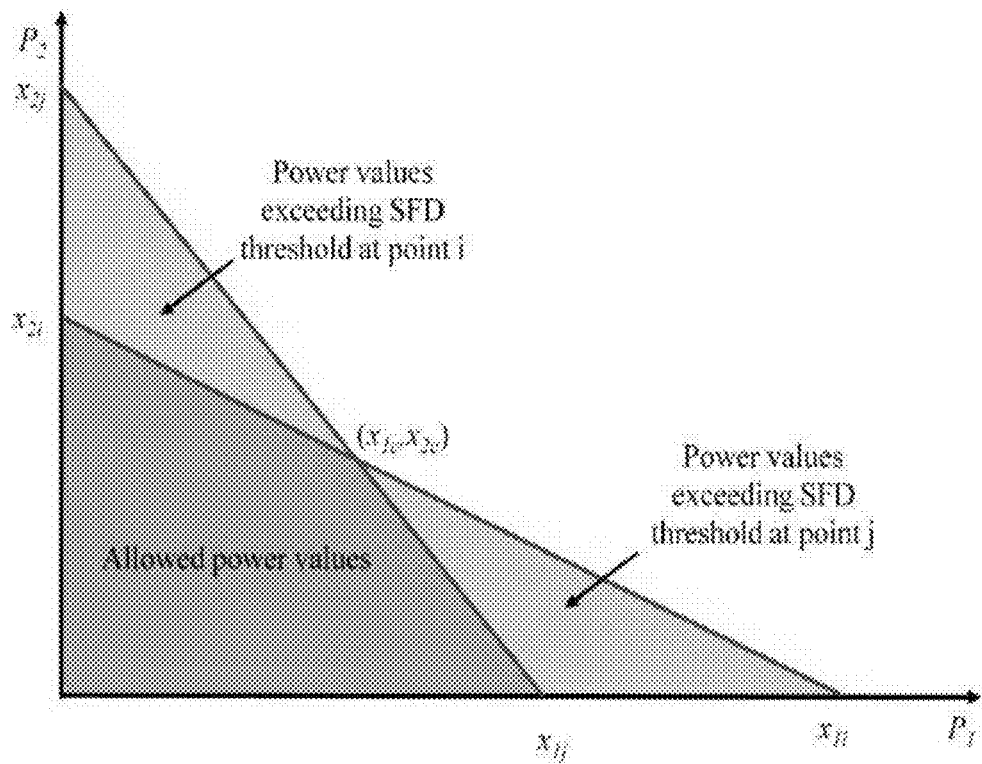
FIG. 11 illustrates the allowed power values at multiple points on the surface.

In particular, FIG. 11 shows the allowed power values at points (i) and (j) on the surface. As shown in FIG. 11, the allowed power values lie somewhere within the darkest region. It can be shown that the optimal power values are either ($x_{1j}$, 0), (0, $x_{2i}$), or ($x_{1c}$, $x_{2c}$). The number of possible optimal values depends on 1) the shape of the surface where the SFD cannot exceed the SFD threshold and 2) the antenna pattern for each of the antennas.

Figure 12:
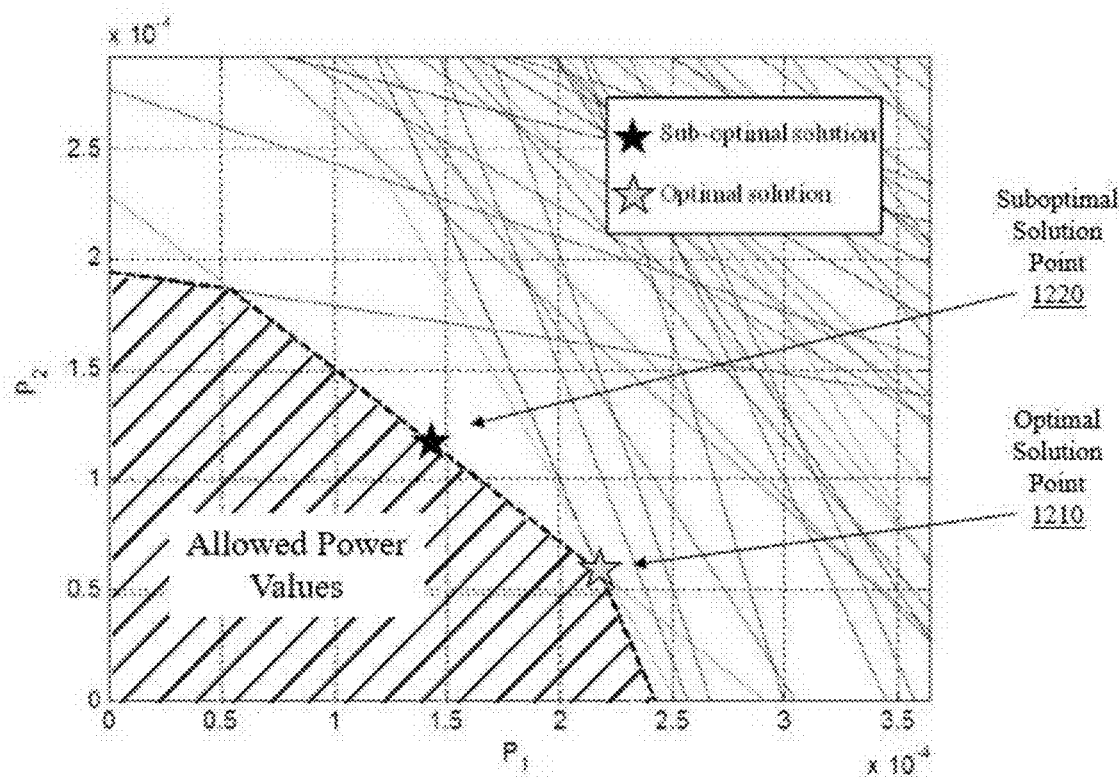
FIG. 12 illustrates an optimal solution for a certain antenna geometry.

FIG. 12 shows the allowed power values for the geometry and the parameters shown in FIG. 6. It is apparent that there are two points (optimal solution point 1210 and suboptimal solution point 1220) defined by the intersection of constraints. Those two points (i.e. optimal solution point 1210 and suboptimal solution point 1220), along with the smallest intersections with the $P_1$ and $P_2$ axes, are the potential optimal solutions. Once all of the potential optimal points are found, the embodiments select the point that has the largest sum of its coordinates to be the final optimal point. The algorithm for finding all of the possible optimal points is described below.

Algorithm for Finding the Optimal Transmit Powers

Step 1: Use Equation Set 7 to calculate $x_{1i} = T/K_{1i}$, and $x_{2i} = T/K_{2i}$ for every i Step 2: Find the index k of the smallest $x_{1i}$ $$k = \text{index}\{\min_{\forall i}\{x_{1i}\}\}$$

Step 3: Find the index l of the smallest $x_{2i}$ $$l = \text{index}\{\min_{\forall i}\{x_{2i}\}\}$$

Step 4: Add ($x_{1k}$, 0) to the list of potential optimal points.
Step 5: Set $P_{stop} = (0, x_{2l})$
Step 6: Set the search limit to the following:

$$L = [0, x_{1k}]$$

Step 7: If k=l, add $P_{stop}$ to the list of potential optimal points. Then, from the list of potential optimal points, choose the point that has the largest sum of the two coordinates and make that point the final optimal point and exit the algorithm, otherwise proceed to the next step.

Step 8: Define the current constraint $C_k$ as:

$$C_k : P_2 = -\left(\frac{x_{1k}}{x_{2k}}\right) * P_1 + x_{2k}$$

Step 9: For every i≠k, create constrain $C_i$ as $$C_i : P_2 = -\left(\frac{x_{1i}}{x_{2i}}\right) * P_1 + x_{2i}$$

Step 10: For every i≠k, find the intersection $C_i$ and $C_k$ using:

$$P_1^{i,k} = \frac{x_{2i} - x_{2k}}{\left(\frac{x_{2i}}{x_{1i}} - \frac{x_{2k}}{x_{1k}}\right)}$$

$$P_2^{i,k} = x_{2k} - P_1^{i,k} * \frac{x_{2k}}{x_{1k}}$$

Step 11: For every i such that $P_1^{i,k} \in L$, find the index of the smallest $P_2^{i,k}$ $$m = \text{index}\{\min_{\forall i}(P_2^{i,k})\}$$

Step 12: Add $(P_1^{i,m}, P_2^{i,m})$ to the list of potential optimal points.

Step 13: Set a new search limit to:

$$L = [0, P_1^{i,m}]$$

Step 14: Set k=m and go to return to Step 7.

The algorithm for optimal power allocation requires more computations than the suboptimal algorithm. The suboptimal algorithm finds the two potential optimal points (min$\{x_{1i}\}$, 0) and (0, min $\{x_{2i}\}$) while the optimal algorithm performs additional computations to find all of the potential optimal points. Usually, the number of additional points that need to be found for the optimal allocation is relatively low (e.g., one to two additional points).

Figure 13:
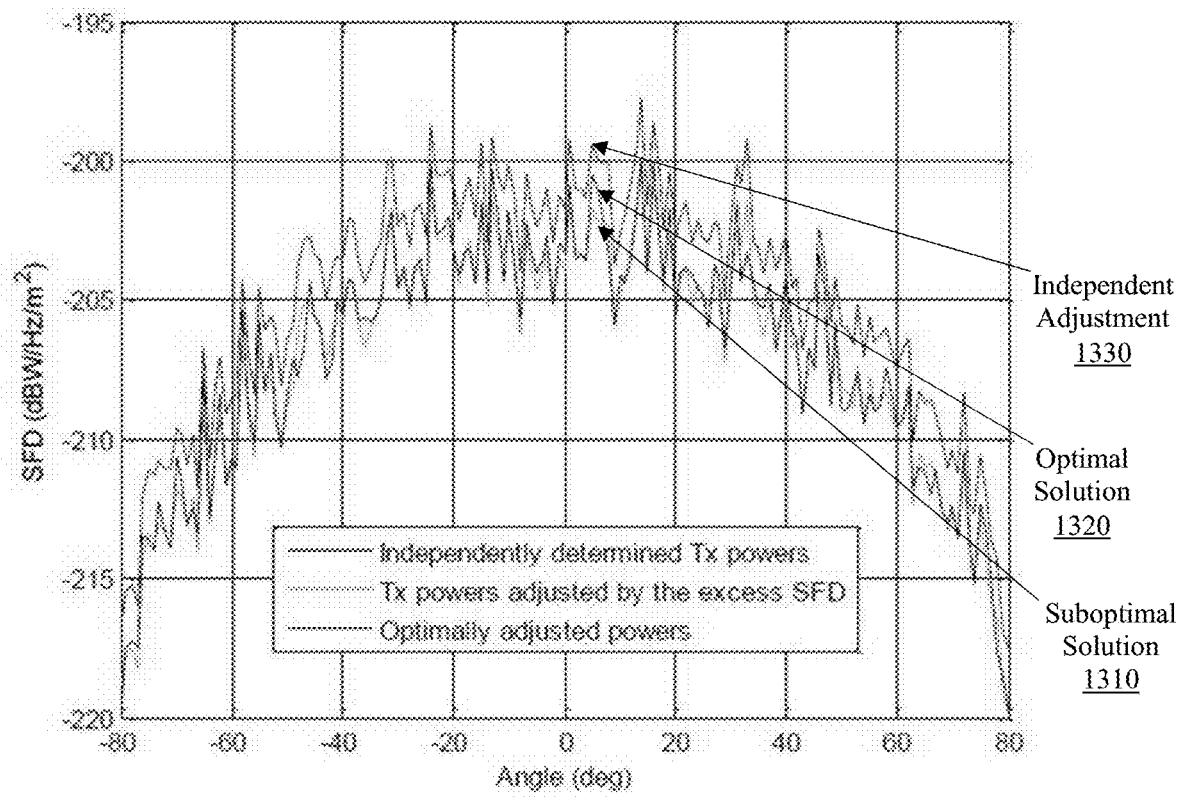
FIG. 13 illustrates an SFD at each point on a surface using suboptimal and optimal power adjustments.

FIG. 13 graphically compares the three techniques (i.e. the independent adjust, the suboptimal adjustment, and the optimal adjustment). To clarify, FIG. 13 illustrates the SFD at each point on the surface using the suboptimal adjustment, the optimal power adjustment, and the independent power adjustment. In particular, line 1310 represents the suboptimal adjustment (i.e. the transmitter powers that are adjusted by the excess SFD); line 1320 represents the optimally adjusted powers; and line 1330 represents the independently determined transmitter powers. As shown in FIG. 13, the optimally adjusted powers (represented by line 1320) and the suboptimal power adjustments (represented by line 1310) never exceed the threshold value (in FIG. 13 the value is −200 dBW/Hz/m²); however, only the optimally adjusted power (line 1320) continuously provides for maximum power transmission. In the situation presented in FIG. 13, the total transmitted power of the optimally adjusted power was larger than the suboptimally adjusted power by approximately 0.25 dB. While the gain in this context might not be sufficient to justify the additional computations, other, more realistic circumstances, such as those described below, do warrant the additional calculations.

Figure 14:
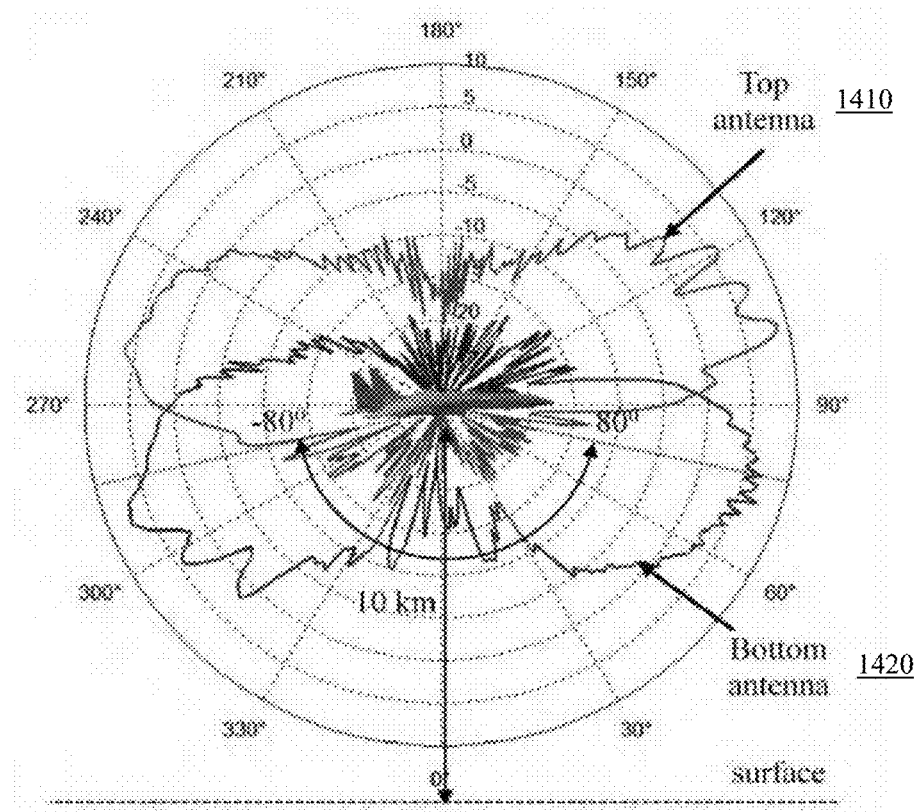
FIG. 14 illustrates a scenario in which multiple antennas are being used.

For instance, FIG. 14 presents an embodiment where one antenna is mounted in a position that is vertically higher than a mounting position of a second antenna. In other words, there is a top antenna 1410 and a bottom antenna 1420. These antennas are depicted as being mounted on a plane. While FIG. 14 shows one example situation in which the antennas are mounted, the embodiments of the present invention are not limited strictly to the depiction shown in FIG. 14.

Figure 15:
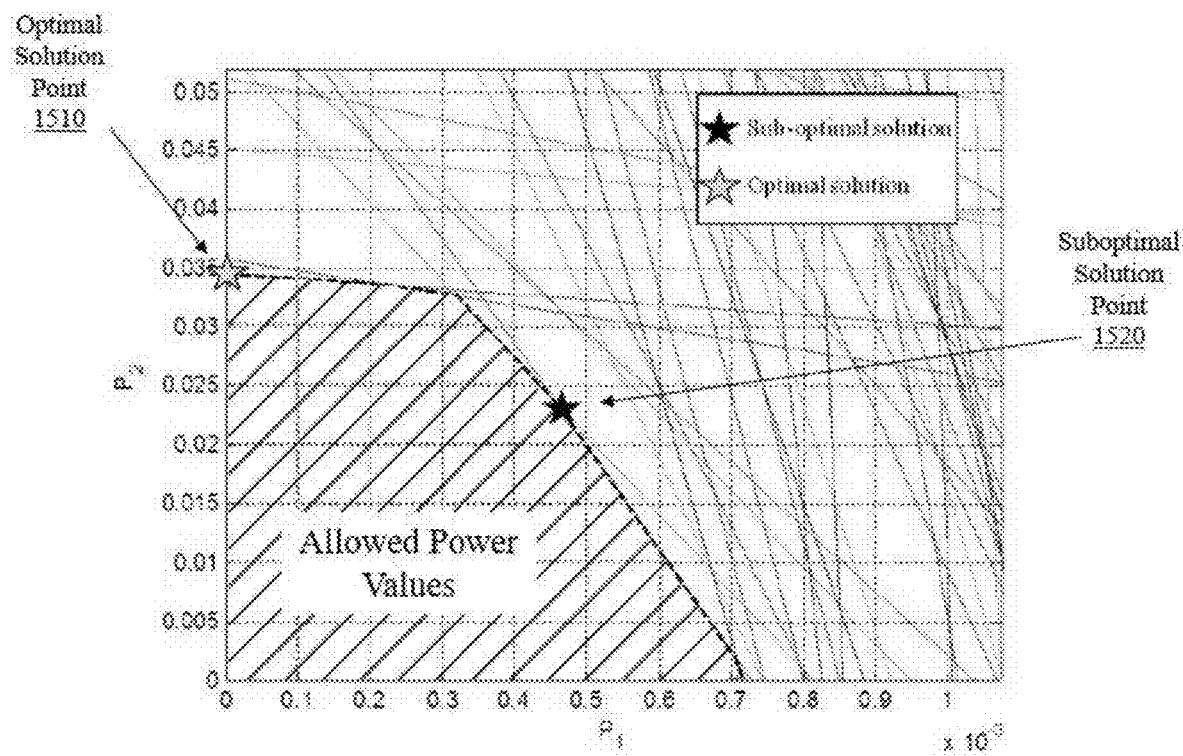
FIG. 15 illustrates an optimal and suboptimal solution for a situation in which multiple antennas are being used.

FIG. 15 shows the optimal and suboptimal solutions for the top-bottom antenna situation. In particular, FIG. 15 shows the optimal solution point 1510 and the suboptimal solution point 1520. To note, $P_2$ is the power transmitted from the top antenna while $P_1$ is the power transmitted from the bottom antenna. The total power transmitted using the optimal power allocation is 1.75 dB larger than the total power that is transmitted using the suboptimal power allocation. In some circumstances, the gain achieved using the optimal power allocation can be as high as 3 dB more than the gain from the suboptimal allocation. The maximum gain is achieved in the worst case scenario which is when both the top and the bottom antennas have the limiting SFD level at the same point of interest on the surface.

Figure 16:
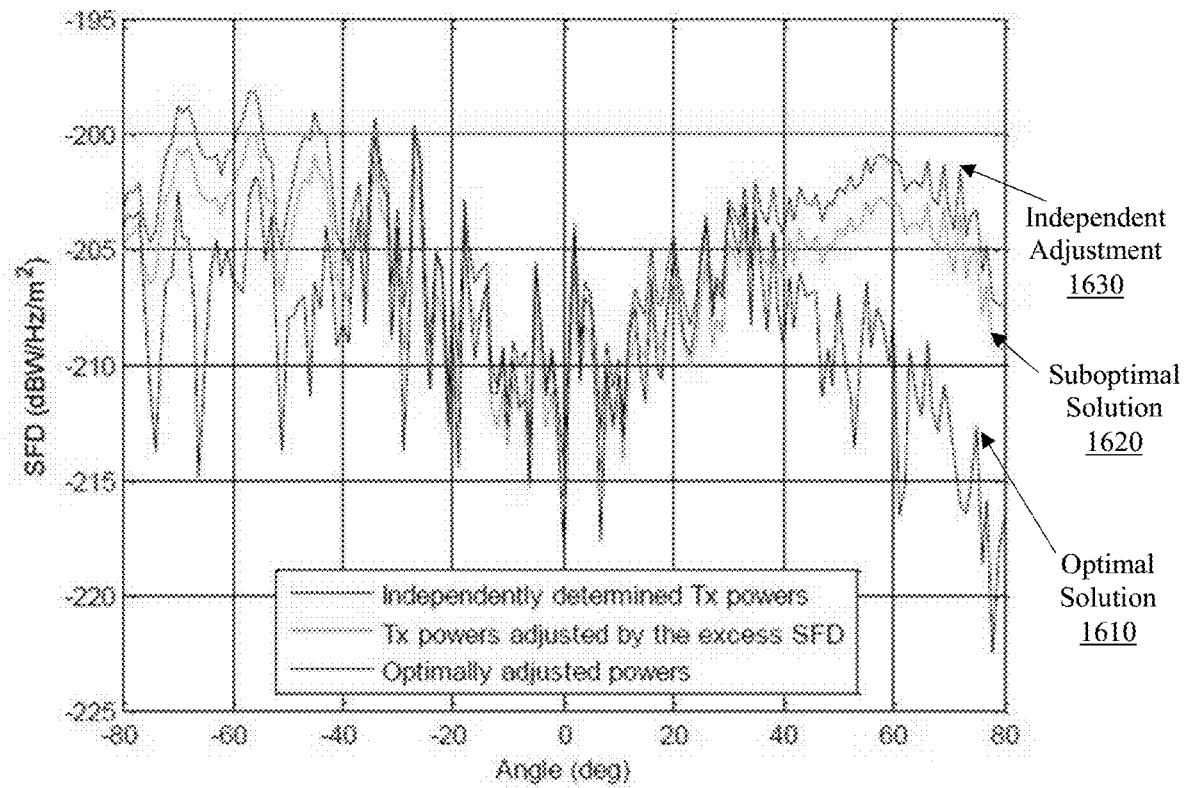
FIG. 16 illustrates the SFD at each point on the surface for the situation in which multiple antennas are being used.

FIG. 16 shows the SFD at each point on the surface for the top-bottom situation. In particular, FIG. 16 shows that the suboptimal adjustment scheme (represented by line 1620) and the optimal adjustment scheme (represented by lines 1610) both keep the SFD levels below the SFD threshold, while the independent adjustment scheme (represented by line 1630) does exceed the threshold value.

In traditional LPD systems, signal transmission power is controlled to satisfy certain link parameters, such as quality, range, data rate, etc. In contested and denied environments, however, the detectability of the system needs to be taken in to account. The present embodiments use the preceding processes and algorithms to dynamically control the amount of power that is transmitted to certain locations in order to maximize the amount of transmitted power while continuously meeting the threshold requirement. To accomplish the foregoing, the embodiments limit the transmission power by using 1) navigation parameters (e.g., latitude, longitude, altitude, and attitude), 2) terrain data (e.g., landscape maps, building schematics, atmospheric conditions, etc.), and 3) antenna radiation patterns. When multiple antennas are used, the power of each antenna is precisely controlled so that the collective transmitted power never exceeds the desired threshold. To reiterate, the present embodiments maximize the total transmitted power (from all of the antennas) while satisfying the detectability constraints. Accordingly, the embodiments can transmit significantly more total power than traditional LPD systems while still meeting the detectability constraints.

Figure 17:
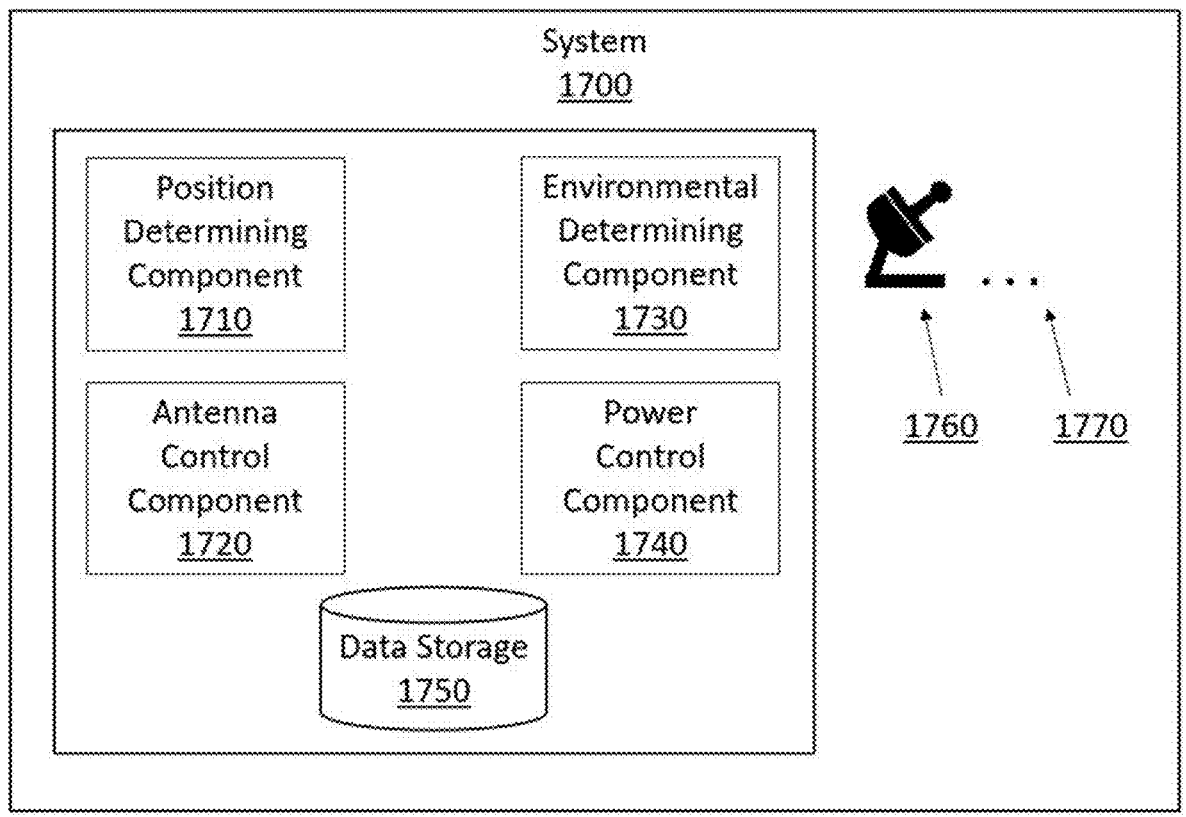
FIG. 17 provides a basic overview of some of the components of a computer system that can enable the system to control the amount of radiated power to a particular location.

The remaining Figures (FIGS. 17-19) describe specific embodiments of the present invention. Although FIGS. 17-19 represent some examples of the embodied forms of the present invention, the present invention should not be limited only to the depictions shown in FIGS. 17-19. Briefly, FIG. 17 shows a system that includes various components that are configured to implement some aspects of the invention. FIG. 18 illustrates an example method that can be followed to achieve the benefits described throughout this disclosure. Lastly, FIG. 19 illustrates another example method in which embodiments of the present invention can be implemented.

FIG. 17 shows a system 1700 that includes various components. For instance, the system 1700 includes a position determining component 1710, an antenna control component 1720, an environmental determining component 1730, a power control component 1740, and a data storage 1750. System 1700 also includes at least one antenna 1760. Although the system 1700 depicts only a single antenna 1760, the ellipses 1770 demonstrate that the embodiments of the present invention can utilize more than one antenna. To clarify, embodiments of the present invention can utilize any number of antennas, and the embodiments are not limited to only a single antenna. Additionally, any type of antenna can be utilized such that the present LPD embodiments are agnostic with regard to antenna type. To further clarify, the embodiments can utilize omni-directional antennas and/or directional antennas. Notably, the antennas each have a corresponding transmitter that is used to generate a power signal that will be radiated from the antennas.

Although it is not shown in FIG. 17, the computer system also includes one or more processors and/or graphics processing units (GPU) that execute computer-executable code stored in one or more computer-readable hardware storage devices. To clarify, system 1700 includes many of the components described in FIG. 1.

When the processors execute the computer-executable code, the various components depicted in FIG. 17 are instantiated in memory and are configured to perform the functions described below.

To illustrate, the position determining component 1710 is configured to determine position information for each of the antennas of the system 1700. This position information can include velocity, latitude, longitude, yaw, pitch, and/or roll determinations. To clarify, when the computer system is operating within an aircraft (such that the antennas are also mounted on the aircraft), the position determining component 1710 can ascertain the aircraft's orientation/attitude (e.g., yaw, pitch, and roll), position (e.g., latitude and longitude), velocity, and acceleration. Similarly, when the computer system 1700 is operating within a floating vessel (e.g., such as the ship 220 in FIG. 2), the position determining component 1710 can acquire similar information for the floating vessel. This position determining component 1710 can utilize various different types of instrumentation to collect the information. For example, the position determining component 1710 can make use of a GPS, an accelerometer, a barometer, a gyroscope, a magnetometer, and/or any other instrument that is usable to determine position, orientation, velocity, and acceleration.

The environmental determining component 1730 is configured to determine environmental information for a defined three-dimensional space within which each of the antennas is operating. Continuing with the example detailed above in which the computer system 1700 is operating with an aircraft, the environmental determining component 1730 can ascertain characteristics of the three-dimensional environment in which the aircraft is flying. Because planes fly in the air, the environmental determining component 1730 can acquire information about its surrounding airspace. Further, in some instances, the defined three-dimensional space can include a ground terrain. As a result, determining the environmental information for the three-dimensional space can include acquiring information about the surface, or rather ground, terrain. This information can be acquired in a variety of ways. For instance, the environmental information could have been previously determined (e.g., perhaps by a satellite passing overhead or some other mapping/scanning technique) and stored in the data storage 1750. The data storage 1750 can maintain a database that retains the environmental information in a manner that is readily available to the environmental determining component 1730.

While the environmental information described above was previously ascertained and stored in the data storage 1750, the embodiments of the present invention are not so limited. For example, instead of previously acquiring the environmental information, some embodiments can acquire that information in real time such that the environmental information is acquired in a dynamic manner. This process can be accomplished by streaming data from the internet (e.g., by streaming maps and/or other types of landscape data or even atmospheric data). Other embodiments may utilize instrumentation that is native to the platform (e.g., the plane) on which the computer system is operating. For example, the plane may include advanced map generation equipment that can be used to dynamically create a real-time rendering of the environment in which the plane is currently operating. Therefore, the embodiments provide for a variety of methods in which the environmental information can be obtained.

Additionally, the environmental determining component 1730 can acquire information for points that are not specifically on the ground (e.g., a point can be in the air and/or in/on the sea). By way of example, some RF detection units might be situated in the airspace or upper atmosphere. The environmental determining component 1730 can acquire information about the environment within which those units are operating (e.g., by acquiring meteorological information) as well as specific information about those units themselves. By way of clarification, some RF detection units may be situated in the air, such as weather balloons or other types of airborne instrumentation. The environmental determining component 1730 can acquire information not only about the environmental aspects in which the computer system 1700 is operating, but also specific information about specific locations or facilities. For example, suppose an RF detection unit is located on the ground and the present LPD embodiments would like to avoid being detected by that ground-based RF detection unit. The environmental determining component 1730 is configured to acquire specific information (e.g., perhaps building schematics, building shape, geographic location, radar array layout, weak infrastructure points, current troop/personnel deployment information, etc.) about that specific facility. Then, using that information, the LPD system can avoid being detected by that facility.

The antenna control component 1720 is configured to determine an antenna radiation pattern (e.g., the antenna radiation pattern 430 shown in FIG. 4) for each of the antennas. Similar to the environmental information, the antenna radiation patterns for each of the antennas can also be stored in a database maintained within the data storage 1750 such that the antenna control component 1720 can query the database to obtain those radiation patterns.

The system 1700 is also configured to identify (within the defined three-dimensional space), one or more points of interest. By way of example, a user of the computer system 1700 (e.g., perhaps a pilot flying the plane or even an operator who is located at a remote base station and who is acting as a mission control specialist for the pilot) could identify one or more specific locations on the ground, in the air, or in/on the sea. These points can include an RF detection unit, other type of structure, or area in which it is desirable to not introduce a power signal (e.g., the homes with the Wi-Fi signals or the research and development institute).

The computer system 1700 is configured to reduce and/or substantially eliminate its detectability with respect to one or more points within the three-dimensional space. For example, suppose the aircraft described earlier is flying in contested or denied airspace. Further, suppose there is a ground-based (or air-based) RF detection unit that is configured to detect and identify aircraft. In this situation, it is expedient for the aircraft to not be detected by the ground-based object detection unit. As a result, the present embodiments dynamically control the collective power that is radiated to the ground-based object detection unit and that is transmitted from the combination of the antennas of the computer system 1700. Using the algorithms and processes described earlier in this disclosure, the embodiments control the collective power (i.e. SFD) so that the collective power (i.e. SFD) transmitted to the points of interest is restricted to be less than a determined threshold value.

To accomplish this control of the collective power, the system 1700 utilizes the power control component 1740 shown in FIG. 17. This power control component 1740 is configured to control the collective power that is radiated to the points of interest and that is transmitted from the combination of the antennas (regardless of whether there is a single antenna or an array of antennas) so that the collective power (i.e. SFD) is less than the determined threshold. Notably, the power control component 1740 utilizes the optimal adjustment procedure/process that was described earlier. At a high level, the power control component 1740 controls the collective power by factoring in 1) the position information for each of the antennas, 2) the environmental information for the defined three-dimensional space (e.g., which may include terrain information), and 3) the antenna radiation pattern for each of the antennas. The power control component 1740 can also factor in a power transmission level for each of the antennas as well as a transmission rate for each of the antennas. As a result, the collective power (i.e. SFD) that is radiated to the points of interest (regardless of whether the point is on the ground, air, or sea) and that is transmitted from the combination of the antennas is continuously maintained to be less than the determined threshold.

Continuing with the aircraft example from above, aircrafts almost continuously change orientation and position. However, the embodiments described herein can continuously ensure that the transmitted power received at the points of interest is less than the determined threshold, even when the aircraft changes positions. For example, in response to a position or orientation change of the aircraft, the embodiments can use the algorithms and processes described herein to continuously control the collective power (i.e. SFD) so that the collective power never exceeds the determined threshold. Even further, using the optimal processes described earlier, the embodiments can ensure that the collective power is continuously maximized at the points of interest while never exceeding the determined threshold.

The following disclosure may refer to a number of methods and method acts that may be performed. Although the method acts may be discussed in a certain order or illustrated in a flow chart as occurring in a particular order, no particular ordering is required unless specifically stated, or required, because an act is dependent on another act as being completed prior to the act being performed.

FIG. 18 describes an example method 1800 that can be followed to obtain the benefits described herein. Method 1800 can be implemented by the computer system 1700 described in FIG. 17.

As shown, method 1800 includes an act (act 1810) in which position information for each antenna is determined. For example, the positioning determining component 1710 can determine the position information in the manner previously described. This position information can include velocity, acceleration, altitude, attitude, etc.

Method 1800 also includes an act (act 1820) in which environmental information for a defined three-dimensional space within which each of the antennas is operating is determined. For example, the environmental determining component 1730 can determine the environmental information in the manner previously described. The environmental information can include characteristics of the three-dimensional space such as information about the surrounding air space or about the surface terrain. This information can be determined previously and stored in the data storage 1750 or it can be determined in a dynamic manner.

Further, method 1800 also includes an act (act 1830) in which an antenna radiation pattern for each antenna is determined. For example, the antenna control component 1720 can determine the antenna radiation patterns in the manner previously described. The radiation patterns can be determined previously and stored in the data storage 1750 or they can be determined in a dynamic manner.

Method 1800 also provides an act (act 1840) of identifying, within the defined three-dimensional space, one or more points of interest. A collective power (i.e. the SFD) that is radiated to the one or more points of interest and that is transmitted from a combination of the antennas will be restricted to be less than a determined threshold. The embodiments allow for many different methods of selecting those points of interest. For example, a pilot of a plane can identify the points, the computer system itself can identify the points, or an entity that is not immediately at the computer system can identify those points (e.g., a base mission operator).

Method 1800 then describes an act (act 1850) of controlling the collective power (i.e. SFD) that is radiated to the one or more points of interest and that is transmitted from the combination of the antennas so that the collective power is less than the determined threshold. This controlling of the collective power (i.e. SFD) is at least partially based on 1) the position information from each of the antennas, 2) the environmental information for the defined three-dimensional space, and 3) the antenna radiation pattern for each of the antennas. Further, by using the optimal solution described earlier, the embodiments can continuously maintain a maximum power output that meets the threshold requirements.

FIG. 19 provides another embodiment of the present invention. In particular, FIG. 19 describes a method 1900 that can be implemented by one or more processors of a computer system, such as the computer system 1700 described in FIG. 17. This computer system includes a first antenna and a second antenna. The first antenna is mounted at a position that is vertically higher than a mounting position of the second antenna. Further, the computer system includes one or more computer-readable hardware storage devices having stored thereon computer-executable instructions that are executable by the one or more processors to cause the computer system to implement the method 1900.

Method 1900 includes an act (act 1910) of determining position information for both the first antenna and the second antenna. For example, the positioning determining component 1710 can determine the position information in the manner previously described. This position information can include velocity, acceleration, altitude, attitude, etc.

Method 1900 also includes an act (act 1920) of determining environmental information for a terrain over which the first antenna and the second antenna are operating. For example, the environmental determining component 1730 can determine the environmental information in the manner previously described. By way of example, the computer system implementing method 1900 can operate within a plane. As the plane flies over the ground, the plane can acquire information about the environment in which it is flying (e.g., the information described earlier that includes schematic information, troop/personnel information, etc.).

The method 1900 also includes an act (act 1930) of determining an antenna radiation pattern for both the first antenna and the second antenna. For example, the antenna control component 1720 can determine the antenna radiation patterns in the manner previously described. The radiation patterns can be determined previously and stored in the data storage 1750 or they can be determined in a dynamic manner.

The method 1900 then shows an act (act 1940) of identifying a ground-based feature (e.g., perhaps an RF detection unit) that is located on the terrain over which the antennas are operating. The environmental information will include information about the ground-based feature. By way of example, the information about the ground-based feature can include the GPS coordinates of the ground-based feature. Further, if the ground-based feature is a building, then the information can include the building's schematics. As indicated, the information can include a plethora of data about the ground based feature and is not limited merely to geographic data.

The method 1900 then shows an act (act 1950) of controlling a collective power (i.e. SFD) that is radiated to the ground-based feature and that is transmitted from a combination of the first and second antennas. This control causes the collective power to be less than a determined threshold. Further, this control is at least partially based on 1) the position information for the antennas, 2) the information about the ground-based feature, 3) the antenna radiation patterns for the first and second antennas, and 4) a combined transmission effect from a signal originally transmitted from the first antenna and a signal originally transmitted from the second antenna.

The method 1900 then closes by showing an act (act 1960) in which the collective power (i.e. SFD) is continuously maximized (using the principles described throughout this disclosure) at the ground-based feature while continuously staying under the determined threshold.

Other embodiments of the present invention may situate the first and second antenna on a plane, sea craft, or automobile. Although not shown in FIG. 19, the method 1900 can include an act of detecting an orientation change of the plane, sea craft, or automobile. For example, a plane could be changing course in midair which would cause the field that is propagating from the antennas to reach areas that were not previously reached (because the plane's fuselage blocked the field). In response to such a change, the embodiments can immediately adjust a power transmission of the first and second antenna. Further, in response to that change, the embodiments can also immediately adjust an update rate of the first and second antennas. Similar to the ability to adjust the update rate, the embodiments can also immediately control the collective power by identifying and/or manipulating a sampling rate that corresponds to how often data about a certain location (e.g., the ground-based feature) is acquired.

As indicated earlier, the embodiments control how much power (i.e. SFD) is transmitted to certain points in a defined three-dimensional space. One way to accomplish the foregoing objective is to include a graphics processing unit (GPU) with the computer system. Using the native parallel processing abilities of the GPU, the computer system can continuously calculate how much power is being transmitted to certain points (e.g., the ground-based feature described with respect to method 1900).

These features can be implemented in various forms. For example, this disclosure described various methods and systems that can be used to exact the benefits described herein; however, the present embodiments are not limited solely to methods or systems. For example, the embodiments can also take the form of computer program products such as hardware storage devices. Indeed, one or more hardware storage devices can include computer-executable code that is executable by one or more processors to achieve the benefits described throughout this disclosure. Accordingly, described herein are systems, methods, and hardware storage devices that can be used to control an amount of radiated power that is transmitted to a particular location. By performing these functions, the present embodiments provide for a low probability of detection (LPD) system that minimizes, or even completely eliminates, the ability to detect the LPD system. The LPD system makes use of the processes and algorithms detailed throughout this disclosure to dynamically select an optimal or suboptimal solution to continuously maximize radiated power while continuously staying below a desired threshold.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer system for controlling an amount of radiated power that is transmitted to a particular location, the computer system comprising:
   one or more processors;
   one or more antennas; and
   one or more computer-readable hardware storage devices having stored thereon computer-executable instructions that are executable by the one or more processors and that cause the computer system to:
   determine position information for each of the one or more antennas;
   determine environmental information for a defined three-dimensional space within which each of the one or more antennas is operating;
   determine an antenna radiation pattern for each of the one or more antennas;
   identify, within the defined three-dimensional space, one or more points of interest, wherein a collective power that is radiated to the one or more points of interest and that is transmitted from a combination of the one or more antennas will be restricted to be less than a determined threshold; and
   control the collective power that is radiated to the one or more points of interest and that is transmitted from the combination of the one or more antennas so that the collective power is less than the determined threshold, wherein the controlling of the collective power is based on 1) the position information for each of the one or more antennas, 2) the environmental information for the defined three-dimensional space, and 3) the antenna radiation pattern for each of the one or more antennas.

2. The computer system of claim 1, wherein each of the one or more antennas is an omni-directional antenna.

3. The computer system of claim 1, wherein each of the one or more antennas is a directional antenna.

4. The computer system of claim 1, wherein the position information for each of the one or more antennas includes a velocity, latitude, longitude, yaw, pitch, or roll determination.

5. The computer system of claim 1, wherein the defined three-dimensional space includes a ground terrain, and wherein determining the environmental information for the defined three-dimensional space includes consulting a database that stores terrain information corresponding to the ground terrain.

6. The computer system of claim 1, wherein the antenna radiation pattern for each of the one or more antennas was previously stored in a database such that determining the antenna radiation pattern for each of the one or more antennas includes querying the database.

7. A computer system for controlling an amount of radiated power that is transmitted to a particular location, the computer system comprising:
   one or more processors;
   a first antenna and a second antenna, the first antenna being mounted at a position that is vertically higher than a mounting position of the second antenna; and
   one or more computer-readable hardware storage devices having stored thereon computer-executable instructions that are executable by the one or more processors and that cause the computer system to:
   determine position information for both the first antenna and the second antenna;
   determine environmental information for a terrain over which the first antenna and the second antenna are operating;
   determine an antenna radiation pattern for both the first antenna and the second antenna;
   identify a ground-based feature that is located on the terrain over which the first antenna and the second antenna are operating, wherein the environmental information includes information about the ground-based feature; and
   control a collective power that is radiated to the ground-based feature and that is transmitted from a combination of the first antenna and the second antenna so that the collective power is less than a determined threshold, wherein the controlling of the collective power is based on 1) the position information for the first antenna and the second antenna, 2) the information about the ground-based feature, 3) the antenna radiation patterns for the first antenna and the second antenna, and 4) a combined transmission effect from a signal originally transmitted from the first antenna and a signal originally transmitted from the second antenna;
   whereby the collective power is continuously maximized at the ground-based feature while continuously staying under the determined threshold.

8. The computer system of claim 7, wherein the first antenna and the second antenna are mounted on a plane, and wherein execution of the computer-executable instructions further causes the computer system to:
   detect an orientation change of the plane; and
   in response to the orientation change of the plane, adjust a power transmission of the first antenna and the second antenna.

9. The computer system of claim 7, wherein the computer system further includes a graphics processing unit (GPU), and wherein the GPU continuously calculates how much power is being transmitted to the ground-based feature.

10. The computer system of claim 7, wherein the first antenna and the second antenna are mounted on a plane, and wherein execution of the computer-executable instructions further causes the computer system to:
   detect an orientation change of the plane; and
   in response to the orientation change of the plane, adjust an update rate of the first antenna and the second antenna.

11. The computer system of claim 7, wherein the position information for the first antenna and the second antenna include a velocity, latitude, longitude, yaw, pitch, or roll determination.

12. The computer system of claim 7, wherein controlling the collective power is also based on a sampling rate corresponding to how often data about the ground-based feature is acquired.

13. A computer system for controlling an amount of radiated power that is transmitted to a particular location, the computer system comprising:
   one or more processors;
   one or more antennas; and
   one or more computer-readable hardware storage devices having stored thereon computer-executable instructions that are executable by the one or more processors and that cause the computer system to:
   determine position information for each of the one or more antennas;
   determine environmental information for a defined three-dimensional space within which each of the one or more antennas is operating;
   determine an antenna radiation pattern for each of the one or more antennas;
   identify, within the defined three-dimensional space, one or more points of interest, wherein a collective power that is radiated to the one or more points of interest and that is transmitted from a combination of the one or more antennas will be restricted to be less than a determined threshold; and
   control the collective power that is radiated to the one or more points of interest and that is transmitted from the combination of the one or more antennas so that the collective power is less than the determined threshold, wherein the controlling of the collective power is based on 1) the position information for each of the one or more antennas, 2) the environmental information for the defined three-dimensional space, 3) the antenna radiation pattern for each of the one or more antennas, 4) a transmission power level of each of the one or more antennas and 5) a transmission rate of each of the one or more antennas.

14. The computer system of claim 13, wherein each of the one or more antennas is an omni-directional antenna.

15. The computer system of claim 13, wherein each of the one or more antennas is a directional antenna.

16. The computer system of claim 13, wherein the position information for each of the one or more antennas includes a velocity, latitude, longitude, yaw, pitch, or roll determination.

17. The computer system of claim 13, wherein the defined three-dimensional space includes a ground terrain.

18. The computer system of claim 17, wherein determining the environmental information for the defined three-dimensional space includes consulting a database that stores terrain information corresponding to the ground terrain.

19. The computer system of claim 13, wherein the antenna radiation pattern for each of the one or more antennas was previously stored in a database.

20. The computer system of claim 19, wherein determining the antenna radiation pattern for each of the one or more antennas includes querying the database.

\* \* \* \* \*